(12) United States Patent
Kunte et al.

(10) Patent No.: US 8,848,692 B2
(45) Date of Patent: Sep. 30, 2014

(54) METHOD AND ARRANGEMENT FOR PROVIDING VOIP COMMUNICATION

(75) Inventors: Klaus-Josef Kunte, Borchen (DE); Bruno Bozionek, Borchen (DE); Thomas Hanna, Detmold (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 768 days.

(21) Appl. No.: 12/679,738

(22) PCT Filed: Sep. 5, 2008

(86) PCT No.: PCT/EP2008/061738
§ 371 (c)(1),
(2), (4) Date: Oct. 11, 2010

(87) PCT Pub. No.: WO2009/043682
PCT Pub. Date: Apr. 9, 2009

(65) Prior Publication Data
US 2011/0038363 A1    Feb. 17, 2011

(30) Foreign Application Priority Data

Sep. 27, 2007   (DE) .......................... 10 2007 046 350

(51) Int. Cl.
*H04L 12/66* (2006.01)
*H04M 7/00* (2006.01)
*H04M 3/436* (2006.01)
*H04L 29/06* (2006.01)

(52) U.S. Cl.
CPC .............. *H04M 3/436* (2013.01); *H04M 7/006* (2013.01); *H04L 65/1079* (2013.01)
USPC ....................................................... 370/352

(58) Field of Classification Search
CPC   H04M 7/006; H04M 15/56; H04M 2215/202
USPC .................................. 370/351–355
See application file for complete search history.

(56) References Cited

U.S. PATENT DOCUMENTS

| 4,922,523 | A | * | 5/1990 | Hashimoto | ................. 379/93.25 |
| 6,772,210 | B1 | * | 8/2004 | Edholm | ........................ 709/226 |

(Continued)

FOREIGN PATENT DOCUMENTS

| CN | 1722862 A | 1/2006 |
| EP | 1744527 A1 | 1/2007 |
| WO | 2007/036399 A1 | 4/2007 |

OTHER PUBLICATIONS

International Preliminary Report on Patentability for PCT/EP2008/061738 Mar. 20, 2010 (Forms PCT/IB/326 and PCT/IB/373).

(Continued)

*Primary Examiner* — Chi Pham
*Assistant Examiner* — Robert Lopata
(74) *Attorney, Agent, or Firm* — Buchanan Ingersoll & Rooney PC

(57) ABSTRACT

The invention relates to a method for providing communication in a VoIP communication network having a multiplicity of network nodes, in which a) at least one first subscriber terminal in the VoIP communication network stores a first item of information containing at least one VoIP connection property desired by the user of the first subscriber terminal in at least one first network node of the VoIP communication network, wherein b) when a second subscriber terminal wishes to connect to the first subscriber terminal, b1) the second subscriber terminal requests the first item of information from the first network node, b2) the second subscriber terminal forms at least one data element that describes the connection on the basis of at least the first item of information, b3) the second subscriber terminal transmits the data element that describes the connection to a functional element which is assigned to the network and switches through direct connections between communication partners, and wherein c) the functional element evaluates the data element in such a manner that it establishes the connection between the first subscriber terminal and the second subscriber terminal on the basis of at least the first item of information. The invention also relates to an arrangement for carrying out the method.

21 Claims, 5 Drawing Sheets

(56) References Cited

U.S. PATENT DOCUMENTS

| | | | |
|---|---|---|---|
| 7,385,992 B1* | 6/2008 | Koch et al. | 370/401 |
| 7,515,701 B2* | 4/2009 | Cohen et al. | 379/211.01 |
| 7,561,563 B2* | 7/2009 | Son | 370/352 |
| 7,573,988 B2* | 8/2009 | Lee et al. | 379/88.17 |
| 7,606,914 B2* | 10/2009 | Ikeda et al. | 709/228 |
| 7,694,015 B2* | 4/2010 | Yoshiuchi et al. | 709/244 |
| 7,729,342 B1* | 6/2010 | Satish et al. | 370/352 |
| 7,965,707 B2* | 6/2011 | Jones et al. | 370/389 |
| 8,054,826 B2* | 11/2011 | Cheng et al. | 370/352 |
| 8,081,747 B2* | 12/2011 | Bangor et al. | 379/210.02 |
| 8,239,468 B2* | 8/2012 | Ikeda et al. | 709/206 |
| 2002/0076022 A1* | 6/2002 | Bedingfield | 379/142.01 |
| 2003/0048880 A1* | 3/2003 | Horvath et al. | 379/88.01 |
| 2003/0128694 A1* | 7/2003 | Hundscheidt et al. | 370/352 |
| 2004/0015765 A1* | 1/2004 | Cooper et al. | 714/750 |
| 2004/0174975 A1* | 9/2004 | Sylvain et al. | 379/211.01 |
| 2005/0041787 A1* | 2/2005 | Casey et al. | 379/88.18 |
| 2005/0201362 A1 | 9/2005 | Klein et al. | |
| 2006/0140173 A1* | 6/2006 | Hoover | 370/352 |
| 2006/0146805 A1* | 7/2006 | Krewson | 370/352 |
| 2006/0153354 A1* | 7/2006 | Brahm et al. | 379/211.02 |
| 2006/0210032 A1* | 9/2006 | Grech et al. | 379/88.19 |
| 2006/0227957 A1* | 10/2006 | Dolan et al. | 379/212.01 |
| 2007/0015535 A1* | 1/2007 | LaBauve et al. | 455/552.1 |
| 2007/0091906 A1* | 4/2007 | Croy et al. | 370/401 |
| 2007/0206747 A1* | 9/2007 | Gruchala et al. | 379/142.01 |
| 2007/0274236 A1* | 11/2007 | Araki | 370/260 |
| 2008/0240081 A1* | 10/2008 | Sindhwani | 370/352 |

OTHER PUBLICATIONS

Srivastava et al. "Preventing Spam for SIP-Based Instant Messages and Sessions", Columbia University, Department of Computer Science, Oct. 28, 2004, pp. 1-15.

International Search Report dated Feb. 4, 2009 for PCT/EP2008/061738 (Form PCT/ISA/210).

Written Opinion of the International Searching Authority for PCT/EP2008/061738 (Form PCT/ISA/237).

* cited by examiner

METHOD AND ARRANGEMENT FOR PROVIDING VOIP COMMUNICATION

CROSS-REFERENCE TO RELATED APPLICATIONS

This application is the United States national phase under 35 U.S.C. §371 of PCT International Application No. PCT/EP2008/061738, filed on Sep. 5, 2008, and claiming priority to German Patent Application No. 10 2007 046 350.4, filed on Sep. 27, 2007. Both of those applications are incorporated by reference herein.

BACKGROUND OF THE INVENTION

1. Field of the Invention

Embodiments relate to methods and arrangements for providing VoIP communication.

2. Background of the Art

Telephoning over a computer network on the basis of the Internet protocol (IP) is known as voice-over IP (VoIP). With VoIP, telephony in this case is shifted to data networks, particularly the Internet.

This results in cost savings for a subscriber of VoIP communication, but associated with the increased proliferation and use of VoIP there is an expectation that there will be an increasing number of Spam over Internet Telephony (SPIT) calls.

It is assumed that SPIT is as annoying to a user as a spam e-mail and perhaps even more so, because with a SPIT call, in contrast to e-mail, there is a loud ring and the receiver is picked up only to hear an electronic voice making an unwanted announcement, and this sometimes occurs even at night.

Furthermore, there are also some possible attack scenarios or misuse scenarios, such as an enticing call with routing to a number that is subject to a charge or a telemarketing call that automatically initiates a sale. In the first case, the SPIT caller uses the announcement to route the callee to a number subject to a charge. In the second case, a sale is made to the callee that should not be charged to him.

The fact that SPIT represents an increasing problem was demonstrated by an American VoIP company in a simulation, which showed that a spammer can send up to 1,000 SPIT messages per minute to IP telephones. This adds up to an incredible potential in terms of annoyance and costs, especially because SPIT calls can also start denial-of-service attacks against IP telephone connections.

At the moment, the spammer can carry out this type of worldwide telephone spam conveniently, because, if he has an account with his victim's provider, then as a rule a call currently does not cost him anything. Although tracing the call back to its origin is technically possible, in practice it is almost impossible, just as with known telephone advertising messages, because the SPIT caller can be located anywhere in the world or the appropriate companies are not in existence long enough for legal prosecution.

Naturally, there is also the risk with VoIP connections that the SPIT caller is simply using a false identity. In this case, these are called "vishing calls" where "vishing" stands for voice-over IP phishing. This is defined as the unauthorized use of false or different identities by criminals by telephone. In the case of so-called "call vishing," a machine calls a list of numbers. A standard announcement requests that sensitive data be provided, such as bank account details, PINs, TAN lists, credit card numbers, eBay or Paypal account data. These types of scenarios are particularly appealing to criminals because of the high level of trust in the telephone as a communication form. Various institutions, such as banks, for example, are already warning their customers about SPIT and vishing.

In order to avoid these activities, it is possible to block a caller, for example, if an impermissibly high number of calls is being transmitted from one source.

Moreover, there is also the approach of setting up so-called white lists, on which people and institutions must be registered before a call is put through for the caller.

There are also so-called black lists, which contain subscriber identifications for which a call is not supposed to be signaled and instead various reactions are carried out depending upon the call identifications, such as rejection, rerouting to a voice box, or referral to an alternative call number subject to a charge.

Furthermore, so-called buddy lists are known, where the callee maintains a list of subscribers from whom he would like to receive calls. Moreover, there is also voice recognition of the caller in order to recognize a SPIT caller on the basis of his voice.

Currently, measures to repel SPIT are being carried out by several operators of Internet gateways. However, this is being done without uniform regulation and to some extent also without an official mandate at the operators' own individual responsibility. This lack of official regulation can also produce a lack of clarity in defining SPIT and in implementing appropriate defense measures. VoIP calls are filtered only by the callee, or in a larger company by its VoIP switching equipment (VoIP softswitch). In this case, there are several more or less efficient methods for detecting and eliminating SPIT.

All previous technical methods for repelling the described risks do not provide a satisfactory solution to protect against SPIT and vishing, because they are inefficient and do not provide omnipotent protection.

BRIEF SUMMARY OF THE INVENTION

It would be helpful to provide a method and an arrangement for providing VoIP communication that provides improved defense mechanisms.

According to the method for providing communication in a VoIP communication network having a multiplicity of network nodes according to the invention,
a) at least one first subscriber terminal in the VoIP communication network stores a first item of information containing at least one VoIP connection property desired by the user of the first subscriber terminal in at least one first network node of the VoIP communication network, such that
b) when a second subscriber terminal wishes to connect to the first subscriber terminal,
  b1) the second subscriber terminal requests the first item of information from the first network node,
  b2) the second subscriber terminal forms at least one data element that describes the connection on the basis of at least the first item of information,
  b3) the second subscriber terminal transmits the data element that describes the connection to a functional element which is assigned to the network and switches through direct connections between communication partners, and then
c) the functional element evaluates the data element in such a manner that it establishes the connection between the first subscriber terminal and the second subscriber terminal on the basis of at least the first item of information.

DETAILED DESCRIPTION OF THE INVENTION

Figure 1:
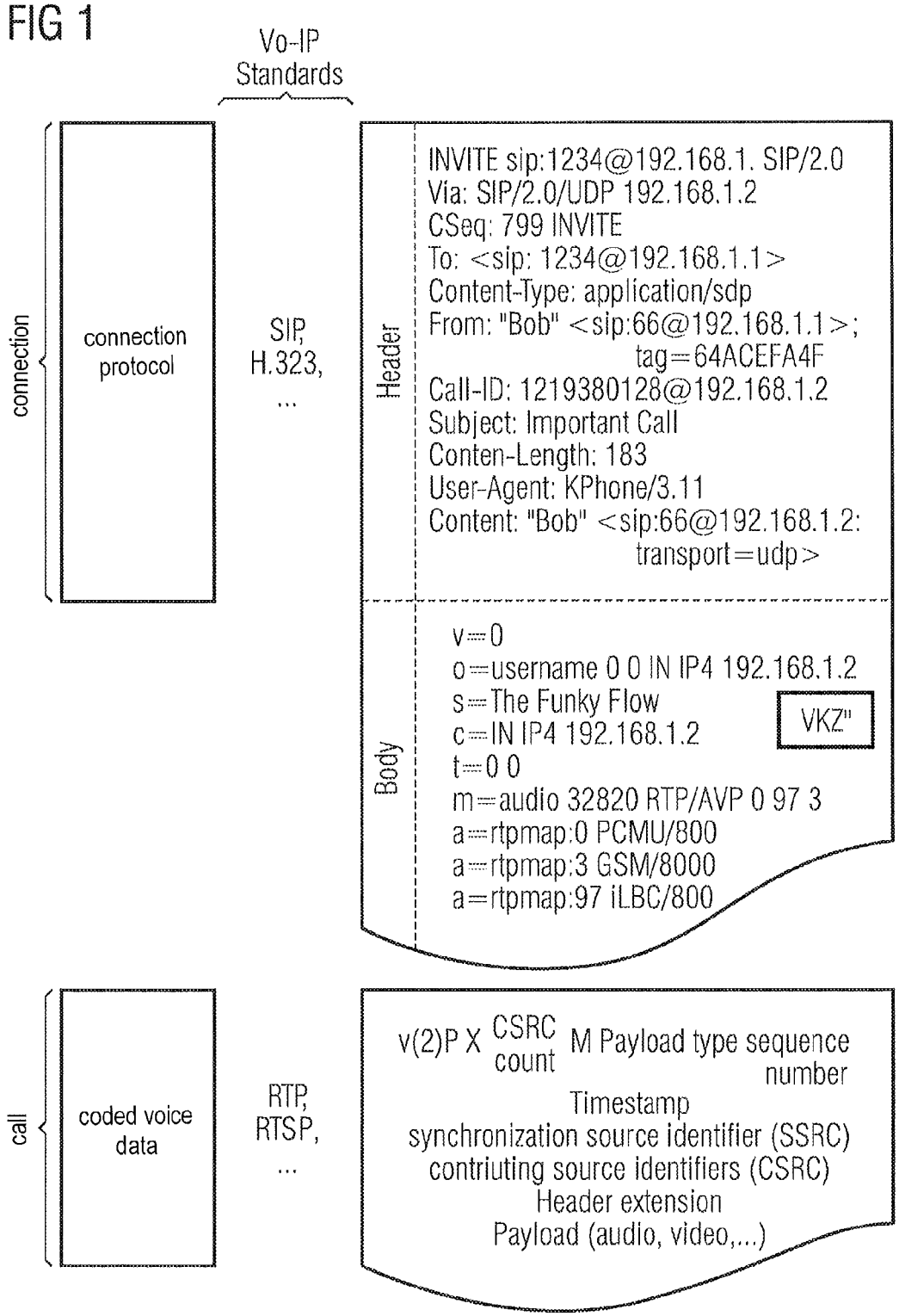
FIG. 1 a schematic of the connection ID according to the invention.

One advantage of a method in accordance with an embodiment of the invention is that a called terminal is given an opportunity to have an effect on incoming calls, in particular to the extent that calls are handled in accordance with properties desired by the user of the called terminal.

In a further development, the first subscriber terminal includes in an advantageous manner information about at least one type of connection permitted for connections to the first subscriber terminal, thereby attaining an additional degree of freedom in influencing incoming calls.

Another advantageous alternative or addition is that the first subscriber terminal includes information about at least one category of call content permitted for connections to the first subscriber terminal as the first item of information. This makes it possible for the subscriber to rule out undesired call content in a targeted manner. For example, if he generally does not want to handle business calls on his private line, this can be accomplished advantageously with this feature. The opposite is also possible, namely blocking private calls on (specific) lines. Naturally, the invention is also able to more precisely identify content that is to be handled specially. Thus, for example, all business calls can be permitted, while calls that are identified as just advertising can be blocked or advertising can be permitted in a targeted manner if it is advertising that is expressly desired by the subscriber, such as bargains from his car dealer, special offers from his travel agency, or the like.

If the first subscriber terminal includes information about a first validity period of a connection as the first item of information, a call with little desired content can be limited in terms of its duration.

Alternatively or additionally, the first subscriber terminal includes information about a second validity period for the time that a voice message left during a connection may last as the first item of information. This makes it possible for resources to be used more effectively, if messages, particularly those with little desired call content, are not able to use up all of the memory capacity. As a result, saved undesired content is superseded by desired content that is to be saved.

If the invention is developed further in such a way that the first subscriber terminal includes information about a third validity period for a period of time during which leaving a voice message is possible as the first item of information, the subscriber is able to determine times during which calls with little desired content are, for example, rerouted to a voice recorder to leave a message.

It is also advantageous if the first subscriber terminal includes a sequence of instructions executable on the first network node as the first item of information. This makes it possible for any terminals to be put in a position of carrying out the actions desired by the subscriber, which are supposed to occur as a function of the first item of information. Individualization is therefore possible, as well as a guarantee that the desired result is achieved by the resources available in the network.

Embodiments are preferably further developed in such a way that, when forming the data element, the first network node and/or the second subscriber terminal adds a first address to the first item of information addressing the second subscriber terminal for receipt of the first item of information. This makes it possible to influence whether a caller who is supposed to be put through is also the requester of the first item of information. This prevents misuse and undesired forwarding of the first item of information.

In this case, the first network node preferably checks the first address to see whether it is an address formed in accordance with the Domain Name System (DNS), so that, if the check reveals that the first address is not an address that can be resolved according to DNS, transmission of the first item of information is stopped.

If, to form the data element, the second subscriber terminal adds information describing the call's category to the first item of information, the preset can be checked automatically by the first subscriber terminal.

In this case, as a further development, the first subscriber terminal is used as the first network node, so that network resources are spared and, in addition, control of the first item of information is left to the first subscriber terminal.

Alternatively, a device assigned to the network for switching to a function that provides direct connections between communication partners can be used as the first network node. As a result, control can be left to the central equipment of a communication network, such as a switching unit.

Alternatively or additionally, an e-mail server can be used as the first network node, so that a connection ID sent as a part of an e-mail or an electronic business card can be kept as part of the e-mail. It is also possible for a web server to be used as the first network node, so that the connection ID can be kept as part of content offered on the World Wide Web.

If the first item of information is kept in the network for a limited time, then an additional degree of freedom can be guaranteed for control by the first subscriber terminal and the current desire can always be met as closely as possible. In addition, misuse of the first item of information is hindered and resources are used more effectively.

Once the limited time has elapsed, the first subscriber terminal preferably again stores a first item of information.

An arrangement for providing communication in a VoIP communication network is characterized by means to carry out the method according to one of the preceding embodiments.

Additional details about the invention as well as advantages starting from the exemplary embodiments of the invention depicted in FIGS. 1 through 5 of the invention will be explained in greater detail.

FIG. 1 schematically depicts the use of the connection ID VKZ" according to the invention. It shows how telephony connections are established in principle via the Internet protocol (IP) so -called voice-over IP (VoIP) connections. Particularly, if they use known voice-over IP (VoIP) standards such as the Session Initiation Protocol (SIP), H.323, the Real Time Transport Protocol (RTP) or the Real Time Streaming Protocol (RTSP) for this.

It also shows in this case that the data produced for such communication can be differentiated as a rule into two classes. On the one hand, a communication such as that shown in the figure is composed of data produced by a connection protocol, such as the data produced by the SIP or H.323 and used to control a voice-over IP communication in particular for calling a partner to communicate. But it can also be composed of coded voice data, such as can be compiled in accordance with the voice-over IP standards RTP or RTSP and can contain the conversation held over the communication connection.

FIG. 1 also shows in the depicted exemplary embodiment that the connection ID VKZ" according to the invention is transmitted as part of the connection protocol to the called subscriber, so that said subscriber is already able, even before a conversation or a connection has been established, to automatically or manually accept, reject or route the call for other handling after evaluating the connection ID VKZ".

Figure 2:
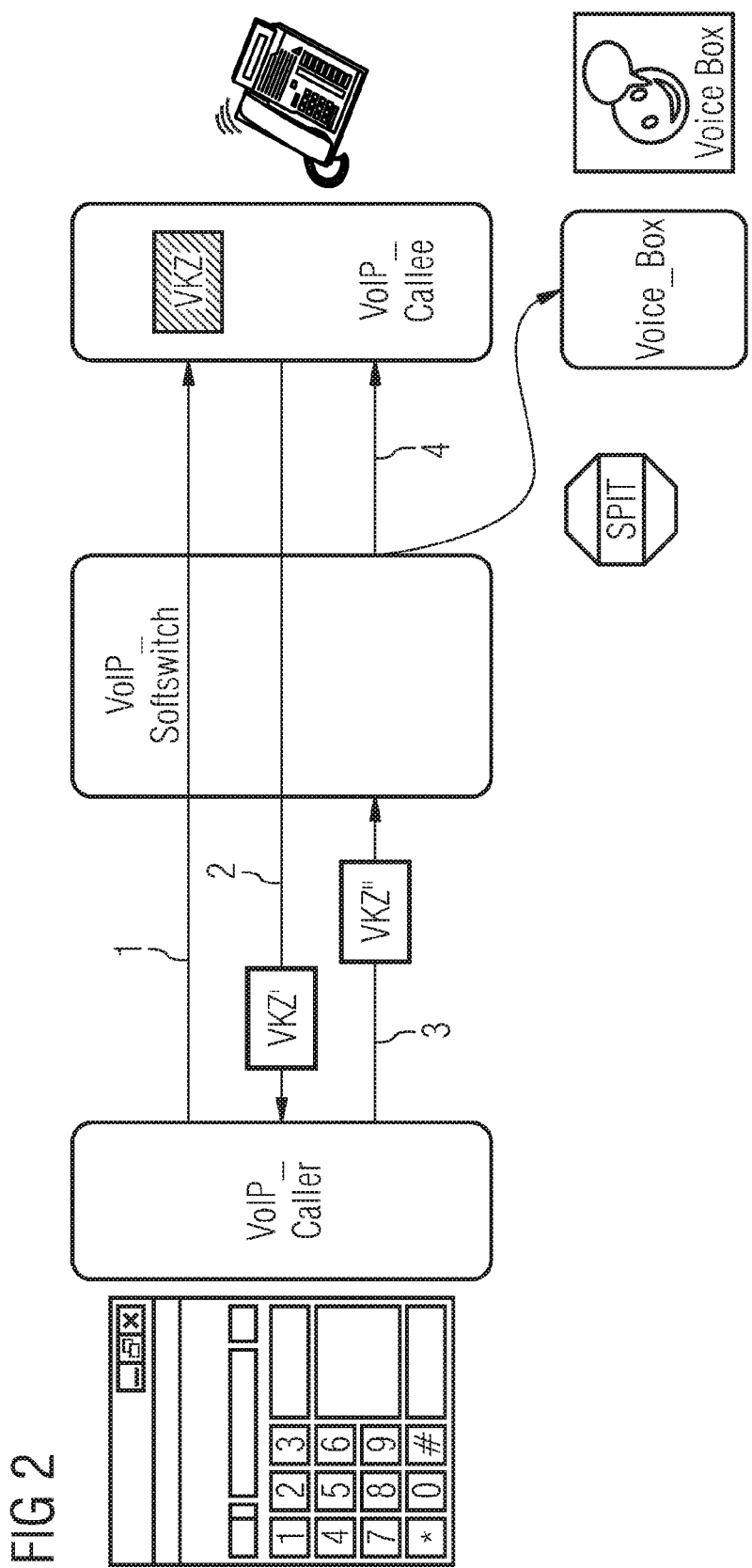
FIG. 2 a schematic of an exemplary embodiment, in which the second subscriber terminal stores the connection ID for checking at a node assigned to the first subscriber terminal, FIG. 3 a schematic of an exemplary embodiment, in which this is sent to a switching center and thus is stored at a node assigned to a second subscriber, FIG. 4 a schematic of an exemplary embodiment, in which an official or a private service is used to issue connection IDs, FIG. 5 a schematic of the structure of a connection ID according to an exemplary embodiment.

FIG. 2 shows a variation of the invention with respect to the location where a first connection ID VKZ created by a subscriber is stored.

According to an embodiment of the invention, a terminal that can also receive calls, designated as VoIP CALLEE in the following, creates a first connection ID as the basis of the method according to the invention, and this first connection ID contains at least the characteristics desired by the VoIP CALLEE, which the VoIP CALLEE expects from future incoming calls or connection requests and/or their handling.

This first connection ID VKZ is requested at a subsequent first point in time 1 from a VoIP CALLER, whereupon, at a second point in time 2, the issuing VoIP CALLEE provides the first connection ID that he has stored with, e.g., the address of the requesting equipment, and thus a second connection ID VKZ' is generated based on the first connection ID VKZ, which is transmitted to the VoIP CALLER as a response to the request, wherein alternatively or additionally, the request can already have been checked upstream by the equipment operating the first connection ID VKZ in such a way that no transmission takes place in response to requests from unauthorized or undesired subscribers.

In this case, the check can be based, for example, on a list containing a compilation of trusted parties, a so-called white list, which can be retrieved from the communication network. Alternatively or additionally, it may also be accomplished on the basis of a list containing subscribers classified as untrustworthy, a so-called black list.

The VoIP CALLER may then, upon initiating a call at a subsequent third point in time 3, also fill the second connection ID VKZ' with at least his address, i.e., the caller address, and/or with characteristics of the call, i.e., whether it is an advertising or business telephone call or a private call, for example, so that a third connection ID VKZ" is generated and included with the connection data.

Based on this third connection ID VKZ", the VoIP SOFT-SWITCH equipment that switches the connection between the VoIP CALLER and the VoIP CALLEE can now execute the characteristics contained in the third connection ID VKZ", e.g., according to an algorithm, which can also already be contained in the first connection ID VKZ, e.g., through the program code executable on the equipment contained in the communication network, and, in accordance with this algorithm, can at a fourth point in time 4 make an evaluation of whether the incoming connection request meets the call features (characteristics) desired by the VoIP CALLEE and, according to this evaluation, make a decision as to whether the connection request or call should be put through or whether alternative steps must be taken to handle the call, such as rejecting the call and/or routing the call to a VOICE BOX.

It is conceivable in this case that, according to an assessment made by the VoIP SOFTSWITCH on the basis of the evaluation result, an acknowledgement can be given to issue connection IDs in such a way that, if the result is positive, i.e., when the call features conform to the desired features, an increase in trustworthiness is noted, while if the appraisal is negative, i.e., in the event that the call features do not conform to the desired features, the trustworthiness of the caller is downgraded. Furthermore, it can be provided that this trustworthiness assessment be utilized in such a way that, when a certain value reflecting a high level of trustworthiness is reached, the caller is included in the white list, while, when a threshold identifying less trustworthy subscribers is reached, the caller can be included in the black list.

Figure 3:
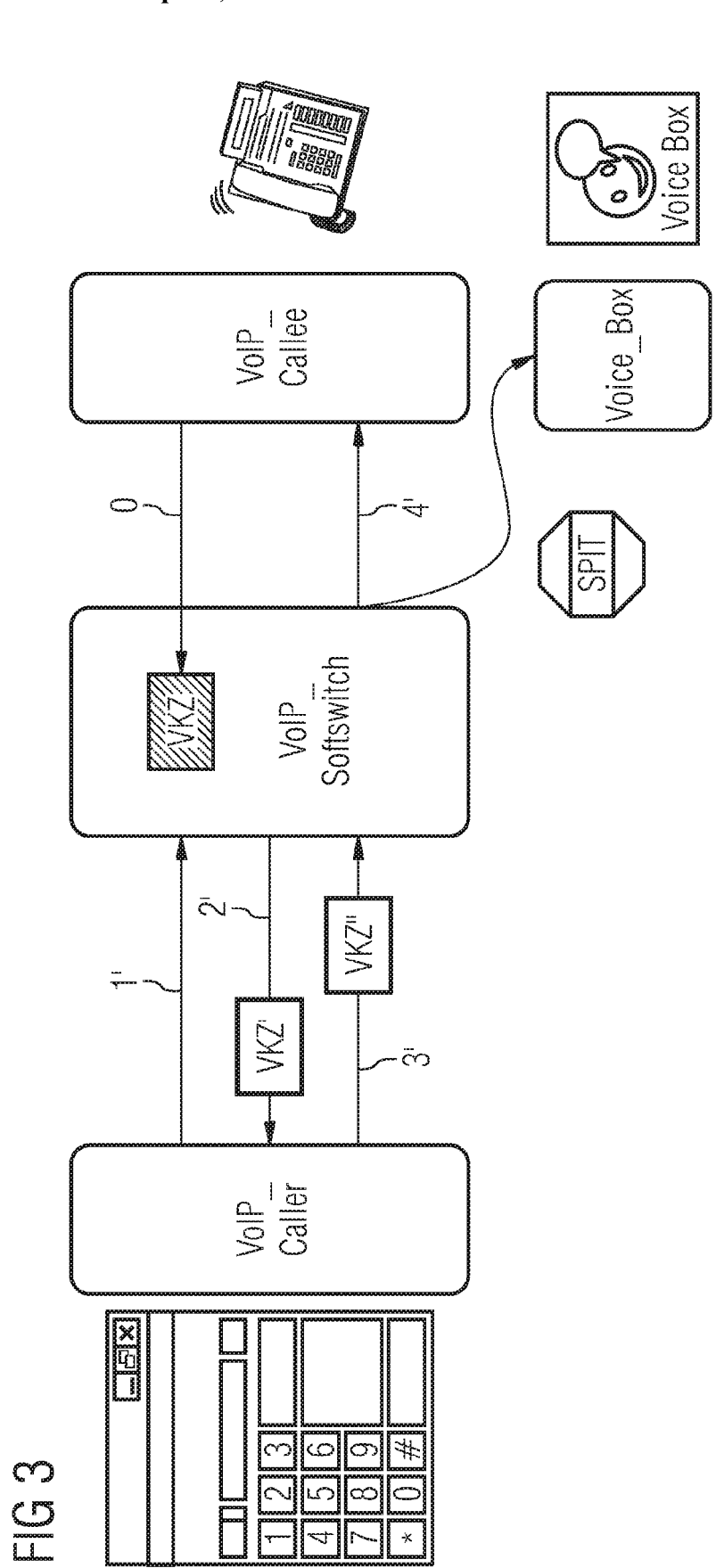

FIG. 3 shows an alternative procedure to the further development described above, but one that is supplementary within one or more communication networks, wherein the first connection ID VKZ is transmitted at a first point in time 0 by the VoIP CALLEE to the switching equipment VoIP SOFT-SWITCH, i.e., the connection ID VKZ is stored at a node assigned to a VoIP CALLER, wherein various distributing mechanisms can be used for the connection ID VKZ in the communication network so that the VoIP CALLER must request the connection ID VKZ from the switching equipment VoIP SOFTSWITCH at a subsequent second point in time 1' in order to allow a call to be put through successfully to the VoIP CALLEE.

At a third point in time 2' the second connection ID VKZ' is transmitted to the VoIP CALLER, who again in a manner analogous to the previous example can enter additional data features identifying this concrete call into the second connection ID VKZ' and thus generate a third connection ID VKZ", which includes the caller data and is transmitted at a fourth point in time 3' to the switching equipment VoIP SOFT-SWITCH, so that the switching equipment VoIP SOFT-SWITCH, as mentioned above, puts through the call at a fifth point in time 4' or can route it, identified as SPIT, to a VOICE BOX, for example.

Figure 4:
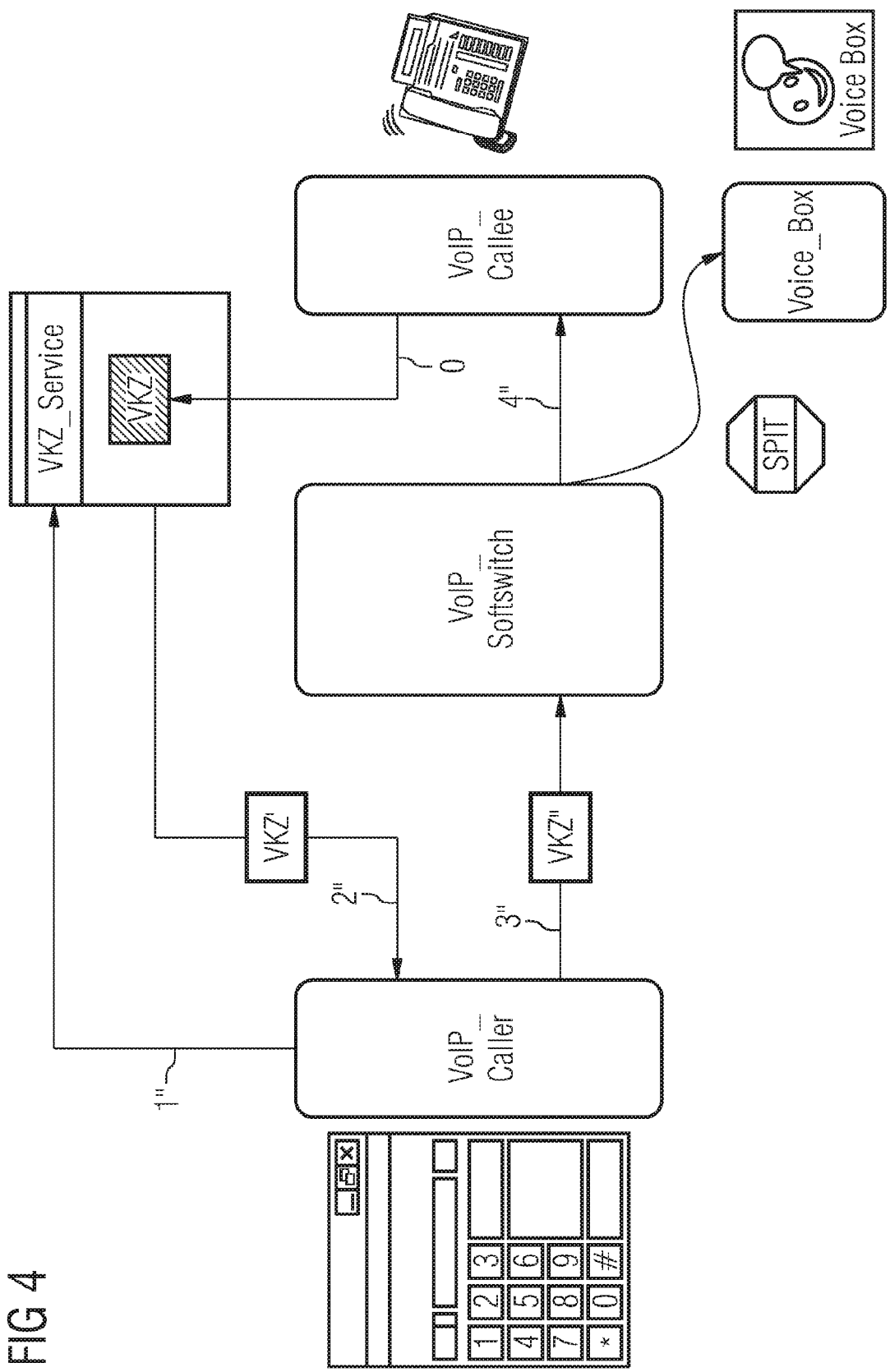

FIG. 4 now depicts another exemplary embodiment of the invention, which includes, along with the known equipment—VoIP CALLER, switching equipment VoIP SOFT-SWITCH, VoIP CALLEE and VOICE BOX—another piece of equipment, namely a VKZ SERVICE, which can be operated officially or even as a private service, which stores the connection ID and transmits it upon request to a requestor so that he can initiate a call as in the exemplary embodiments described above, whereupon the switching equipment VoIP SOFTSWITCH can subject the call to the handling described above based on the third connection IDs VKZ".

Figure 5:
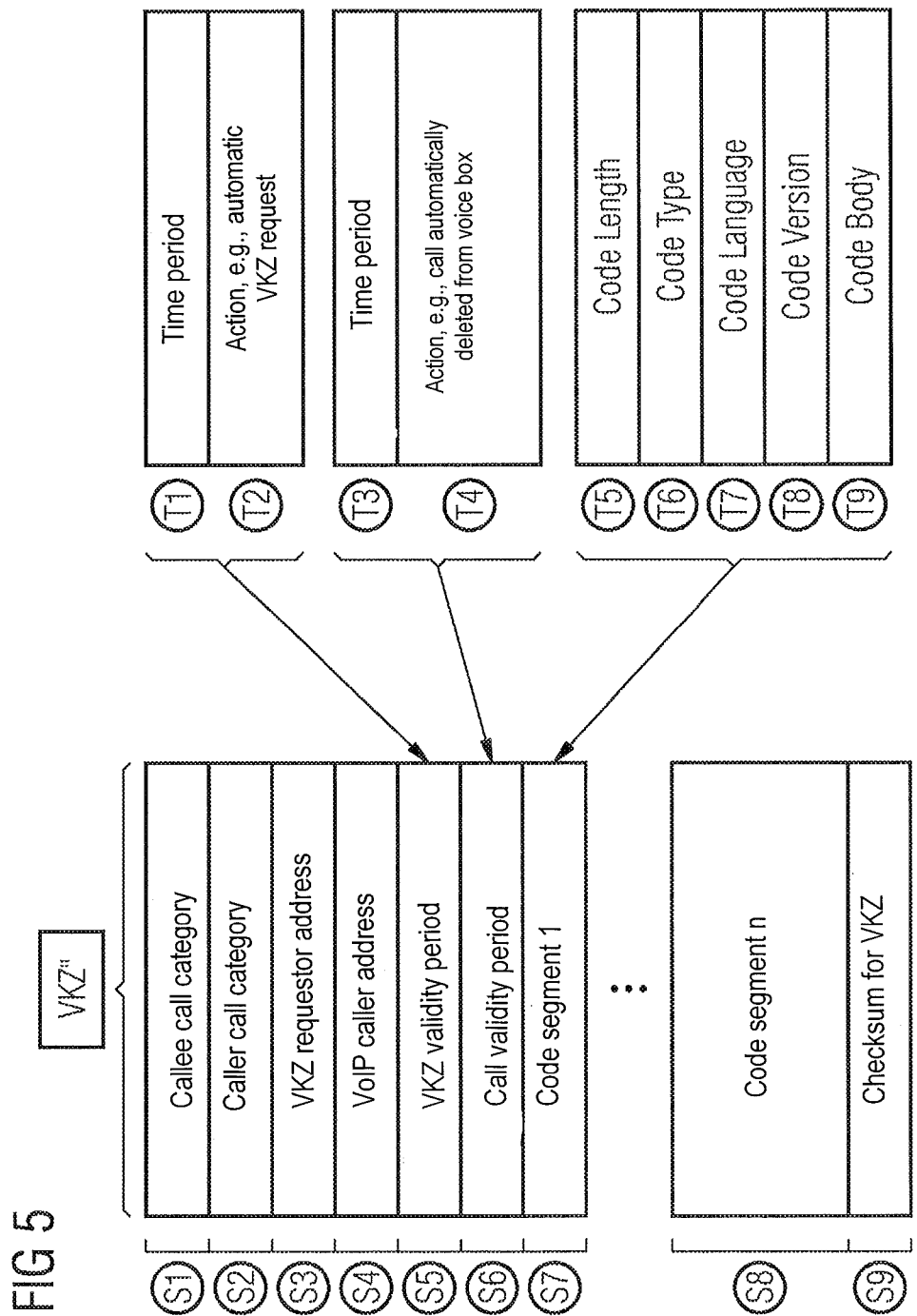

FIG. 5 depicts an example of a structure of the third connection ID VKZ" that provides this type of handling.

It shows that, in the case of the exemplary embodiment according to the invention, a third connection ID VKZ" contains information in a first segment S1 about the call categories that are permitted by the callee or intended for special handling. In addition, as the depiction shows, the connection ID VKZ" contains a caller call category, which was entered by the call partner (caller) desiring communication into the connection ID VKZ".

A third connection ID VKZ" made up of the first segment S1 and the second segment S2 represents a minimum solution for a connection ID VKZ" in accordance with the invention, because comparison of the callee call category and the caller call category can already be used in this case for call handling in accordance with the invention.

It is especially advantageous if the connection ID VKZ" according to the exemplary embodiment also has an address for the subscriber desiring the call. Because said subscriber must request the connection ID VKZ" according to the invention before he can make or initiate a call, it is designated as the VKZ requestor address in a third segment of the information item that contains the connection ID VKZ". This address is entered either by the VKZ requestor or an entity issuing the connection ID VKZ" (e.g.: terminal, switching center or public/private service).

A fourth segment S4 contains the caller address of the subscriber desiring the call. As a rule, this will be the caller's telephone number, but it can also be realized by other appropriate types of addressing. According to the invention, the address of the requestor (requestor address) in the third segment S3 can be subject to a comparison, for the evaluation cited in the above examples, with the caller address in the fourth segment S4 so that, according to an exemplary embodiment of the invention, the call is only put through if the requestor address and caller address correspond, thereby preventing the misuse of a connection ID VKZ' that was transmitted to a requestor in such a way that said requestor would route the connection ID VKZ' to unauthorized third parties.

Even just combining elements of the third segment with the fourth segment S4 or in combination with the first segment S1 and the second segment S2, for example, can already permit a minimum solution of the method according to the invention.

Alternatively or additionally, the connection ID VKZ" features a fifth segment S5, a validity period. This may contain, e.g., in a first sub-segment T1, the indication of a time period, which indicates when an action indicated in a second sub-segment T2 is to be executed, such as an automatic VKZ request as soon as the time period has elapsed.

Alternatively or additionally, the connection ID VKZ" may also contain the validity period of a call in a sixth segment S6, which in a third sub-segment T3 likewise contains the indication of a time period relating to an action specified in a fourth sub-segment T4. Such an action can relate, e.g., to automatically deleting a call stored in the voice box once the time period has elapsed. Alternatively, it may also describe the time period during which a call from the requestor designated by the connection ID VKZ is permitted or even the point in time when the caller may (again) call (after he was suspended for a time due to misuse, for example).

Alternatively or additionally, the connection ID according to the exemplary embodiment has program code parts 1 to n in seventh to eighth segments S7, S8, which describe an executable program, which, e.g., makes it possible to evaluate a connection ID VKZ" in accordance with the invention. The program code parts contained in the seventh segment S7 may in this case contain, along with the executable code itself, additional sub-segments T5 through T8, which more closely specify the program code for the seventh code segment S7 and the eighth code segment S8, such as the length, type and language of the code.

As a result, in the case of an undesired connection, for example, if the call category does not conform, a directive is automatically executed concerning how this VoIP connection is to be handled, e.g., routing to a VOICE BOX.

It is also advantageous in this case if information with the checksum about the connection ID VKZ" is contained in a ninth segment S9, so that errors or manipulations can be detected more easily.

The described VoIP connection IDs, which are used to classify and verify the VoIP connections, are a piece of the solution. Along with additional meta-information, such as the validity period, said ID shows how the VoIP connection or the call is to be handled.

The depicted exemplary embodiments contain another aspect of the invention, which is storing this connection ID in the communication network so that it can be retrieved from the communication network by a caller and is added as the connection ID when establishing a VoIP connection.

In contrast to previous defense measures that require activity on the callee side, embodiments of the inventive method may operate indirectly, i.e., prior to a VoIP call being established, the caller must acquire the connection ID and identify the VoIP connection.

In this case, the connection ID is exchanged end-to-end between a caller and a callee and may be used multiple times. This connection ID can be analyzed in the communication network, as explained schematically in the foregoing, by a VoIP softswitch and evaluated in such a way that only identified connections are put through to the callee. As a result, only a limited circle of callers is permitted, who may establish VoIP connections with the callee until revoked. A SPIT connection or vishing connection that does not contain the connection ID is thus intercepted in an advantageous manner by the communication network at an early stage.

The method also allows wanted advertising calls to be established if the callee so desires. If he no longer wants this, then he simply changes the indication of the call category in the connection ID, whereupon the connection ID is again stored on a system node assigned to the user.

The invention is further characterized in that implementation is possible easily in an existing communication system, in that only the software for establishing a VoIP connection message and the corresponding software on the evaluating VoIP softswitch or the indicated alternatives must be adapted in accordance with the inventive method.

At the core, the following applies to all depicted exemplary embodiments:

a) When acquiring the connection ID, a check is made to see whether the requesting address is resolvable via DNS. Addresses that cannot be traced can be kept from acquiring the connection ID.

b) The requesting address is a part of the connection ID and is stored in its data portion, so that it is possible to subsequently analyze whether the requestor and caller are identical.

c) When requesting the connection ID from future callers, the type of desired connection can be indicated. Thus, it is possible to describe the character of the VoIP connection quite deliberately, such as whether it is advertising or whether it is a personal, urgent or business manner, whether a connection confirmation should be included, etc., wherein the characterization is accomplished using predetermined and definable parameters.

d) The callee then has the opportunity to decide how or what should happen to the VoIP call, e.g., to allow or reject advertising, whether to reroute to a VOICE BOX or refer to an alternative call number subject to a charge, such as a cellular phone network or a landline. The invention can also be used, however, to put through specifically targeted advertising calls, e.g., from one's own bank or car dealer, etc.

Furthermore, the invention can be further developed such that, if the characterization and content of the call do not coincide, additional appropriate measures may be undertaken, e.g., no longer accepting any call from the affected user in the future (reputation feature).

To this end, the connection ID can indicate the validity of a VoIP call using internal parameters so that, as applicable, a call stored in a VOICE BOX would then be deleted automatically once the validity period has elapsed or VoIP calls would be able to be saved in a VOICE BOX only during the validity period.

In summary (in addition to the described variations), the connection IDs can be stored in the following entities:
1. In the VoIP softswitch
3. In an e-mail (e-mail server)
4. In a Versit card (electronic business card)
5. On an Internet page (web server)
6. Using a public service accessible on the Internet If the connection ID is stored by a callee on a node assigned to the caller, the caller can already be prevented from establishing the call at the beginning, upon entry into the communication network.

What must be emphasized is that, in the event that the connection ID VKZ is stored by the callee on a public service or private service, the invention can be advantageously further developed in such a way that transmitting the connection ID to the caller can be made contingent upon payment of a fee to the operator of the public service or private service.

This type of acquisition of the connection ID thus includes additional possibilities for control. If the connection ID VKZ is requested by the VoIP client, it is possible to control that calls are accepted only from this VoIP client. This rule would likewise be applicable to the VoIP softswitch.

Requesting or retrieving a connection ID VKZ takes place in a protocol-controlled manner in accordance with an advantageous further development. For special safety requirements, this is accomplished using a secured protocol. Incorporation into the different protocol families (SIP, H.323, RTP, RTSP, SMTP, HTTP, etc.) is possible without difficulty according to the invention.

The invention claimed is:

1. A method for providing communication in a voice over IP (VoIP) communication network having a multiplicity of network nodes, comprising:
    storing in one of a first network node of the VoIP communication network and a first subscriber terminal a first item of information comprising a VoIP connection property identified by a user of the first subscriber terminal in the VoIP communication network;
    when a second subscriber terminal attempts to initiate establishment of a connection to the first subscriber terminal:
        requesting by the second subscriber terminal the first item of information from the one of the first network node and the first subscriber terminal,
        forming at least one data element wherein said data element describes the connection the second subscriber terminal seeks to establish with the first subscriber terminal on the basis of at least the first item of information, and
        transmitting by the second subscriber terminal the data element to the first network node or to a second network node;
    the first network node or the second network node evaluating the data element transmitted by the second subscriber terminal such that the connection between the first subscriber terminal and the second subscriber terminal is established upon a determination by the first network node or the second network node that evaluates the data element transmitted by the second subscriber terminal that the connection described by the data element complies with at least the first item of information and a connection is established between the second subscriber terminal and network element associated with the user of the first subscriber terminal upon a determination by the first network node or the second network node that evaluates the data element transmitted by the second subscriber terminal that the connection described by the data element does not comply with at least the first item of information.

2. The method of claim 1, wherein the first network node is one of a switch device, a softswitch and a piece of equipment hosting a service and the second network node is a switch device or a softswitch.

3. The method of claim 1, wherein the first item of information is stored in the first subscriber terminal.

4. The method of claim 1, wherein the first item of information is stored in the first network node.

5. The method of claim 1, comprising including in the first item of information at least one of (a) information about a first validity time period for the connection, (b) information about a second validity period for an amount of time that a voice message left during the connection to the network element may be saved prior to deletion of the voice message, (c) information about at least one type of connection permitted for connections to the first subscriber terminal, (d) information about at least one category of call content permitted for connections to the first subscriber terminal, and (e) information about a third validity period for a period of time during which leaving a voice message is possible.

6. The method of claim 1, wherein the at least one data element comprises an address of the second subscriber terminal at a time of the requesting of the first item of information and an address of the second subscriber terminal at a time of the forming of the at least one data element.

7. The method of claim 6, comprising one of the first network node and the second network node comparing the address of the second subscriber terminal at the time of the requesting of the first item of information and the address of the second subscriber terminal at the time of the forming of the at least one data element; and
    upon a determination by one of the first network node and the second network node to which the data element was transmitted by the second subscriber terminal that the address of the second subscriber terminal at the time of the requesting of the first item of information and the address of the second subscriber terminal at the time of the forming of the at least one data element do not match, the connection between the second subscriber terminal and the network element associated with the user of the first subscriber terminal is established.

8. The method of claim 6, comprising one of the first network node and the second network node comparing the address of the second subscriber terminal at the time of the requesting of the first item of information and the address of the second subscriber terminal at the time of the forming of the at least one data element; and
    upon a determination by one of the first network node and the second network node to which the data element was transmitted by the second subscriber terminal that the address of the second subscriber terminal at the time of the requesting of the first item of information and the address of the second subscriber terminal at the time of the forming of the at least one data element do not match, the connection with the first subscriber terminal sought by the second subscriber terminal not being put through.

9. The method of claim 1, comprising
    adding a first address to the first item of information that corresponds with an address of the second subscriber included in the requesting of the first item of information to update the first item of information and sending the updated first item of information to the second subscriber terminal in response to the requesting of the first item of information and wherein the at least one data element is formed by the second subscriber terminal.

10. The method of claim 1, comprising when forming the data element, the second subscriber terminal including in the data element information describing a category of calls to which the connection the second subscriber terminal seeks to establish with the first subscriber terminal falls within.

11. The method of claim 1, wherein the first subscriber terminal receives calls and makes calls.

12. A method for providing communication in a voice over IP (VoIP) communication network having a multiplicity of network nodes, comprising:
   storing in one of a first network node of the VoIP communication network and a first subscriber terminal a first item of information comprising a VoIP connection property identified by a user of the first subscriber terminal in the VoIP communication network;
   to establish a connection to the first subscriber terminal, the second subscriber terminal:
      requesting the first item of information from the one of the first network node and the first subscriber terminal,
      forming at least one data element wherein said data element describes the connection on the basis of at least the first item of information, and
      transmitting the data element by the second subscriber terminal to the first network node or to a second network node;
   the first network node or the second network node evaluating the data element transmitted by the second subscriber terminal such that the connection between the first subscriber terminal and the second subscriber terminal is established upon a determination by the first network node or the second network node evaluating the data element that the connection described by the data element complies with at least the first item of information and a connection is established between the second subscriber terminal and a network element associated with the user of the first subscriber terminal upon a determination by the first network node or the second network node evaluating the data element that the connection described by the data element does not comply with at least the first item of information;
   wherein a device assigned to the VoIP communication network for switching to provide direct connections between communication partners is the first network node.

13. The method of claim 1, wherein an e-mail server or web server is the first network node.

14. The method of claim 1, wherein the first item of information is stored until a predetermined amount of time passes.

15. The method of claim 14, comprising repeatedly storing the first item of information in the first subscriber terminal once the predetermined amount of time has elapsed.

16. A system for providing communication in a VoIP communication network, comprising:
   a first subscriber terminal;
   a first network node, the first network node communicatively connectable to the first subscriber terminal;
   a first item of information being storable in one of the first subscriber terminal and the first network node, the first item of information comprising a connection property identified by a user of the first subscriber terminal in the network;
   one of the first network node and the first subscriber terminal receiving a request for the first item of information from a second subscriber terminal and responding to that request by sending a response that comprises information of the first item of information to the second subscriber terminal such that a data element is formable by the second subscriber terminal;
   one of the first network node and a second network node communicatively connectable to the first subscriber terminal receiving the data element from the second subscriber terminal that is sent by the second subscriber terminal to establish a connection with the first subscriber terminal, the data element describing the connection the second subscriber terminal seeks to establish with the first subscriber terminal; and
   one of the first network node and the second network node evaluating the data element received from the second subscriber terminal such that a connection between the first subscriber terminal and the second subscriber terminal is establishable upon a determination by the one of the first network node and the second network node that evaluates the received data element that the connection described by the data element complies with at least the first item of information and a connection between the second subscriber terminal and a network element associated with the user of the first subscriber terminal is establishable upon a determination by the one of the first network node and the second network node that evaluates the received data element that the connection described by the data element does not comply with at least the first item of information.

17. The system of claim 16, wherein the first network node is one of a switch device, a softswitch and a piece of equipment hosting a service and the second network node is a switch device or a softswitch.

18. The system of claim 17, wherein the data element comprises an address of the second subscriber terminal at a time of the requesting of the first item of information and an address of the second subscriber terminal at a time of the forming of the at least one data element and wherein:
   one of the first network node and the second network node compares the address of the second subscriber terminal at the time of the requesting with the address of the second subscriber terminal at the time of the forming identified within the data element to determine how to route the connection sought by the second subscriber terminal.

19. The method of claim 9, further comprising the first network node checking the first address to see whether the first address is formed in accordance with a Domain Name System (DNS) and stopping transmission of the first item of information upon a determination that the first address is not an address that can be resolved according to DNS.

20. The method of claim 1, wherein the network element is a voice box for the user of the first subscriber terminal, voice messages being storeable in the voice box.

21. A method for providing communication in a voice over IP (VoIP) communication network having a multiplicity of network nodes, comprising:
   storing in one of a first network node of the VoIP communication network and a first subscriber terminal a first item of information comprising a VoIP connection property defined by a user of the first subscriber terminal in the VoIP communication network;

receiving a request from a second subscriber terminal for the first item of information;

forming at least one data element, wherein said data element describes a connection the second subscriber terminal seeks to establish with the first subscriber terminal on the basis of at least the first item of information;

the first network node or the second network node receiving the data element;

the first network node or the second network node that received the data element evaluating the data element, establishing a connection between the first subscriber terminal and the second subscriber terminal upon a determination by the first network node or the second network node that received and evaluated the data element that the connection described by the data element complies with at least the first item of information; and establishing a connection between the second subscriber terminal and a network element associated with the user of the first subscriber terminal upon a determination by the first network node or the second network node that received and evaluated the data element that the connection described by the data element does not comply with at least the first item of information.

* * * * *